E. A. EDMONDS.
SEARCH LIGHT PROJECTOR.
APPLICATION FILED NOV. 6, 1911.
1,047,395.
Patented Dec. 17, 1912.
3 SHEETS—SHEET 3.
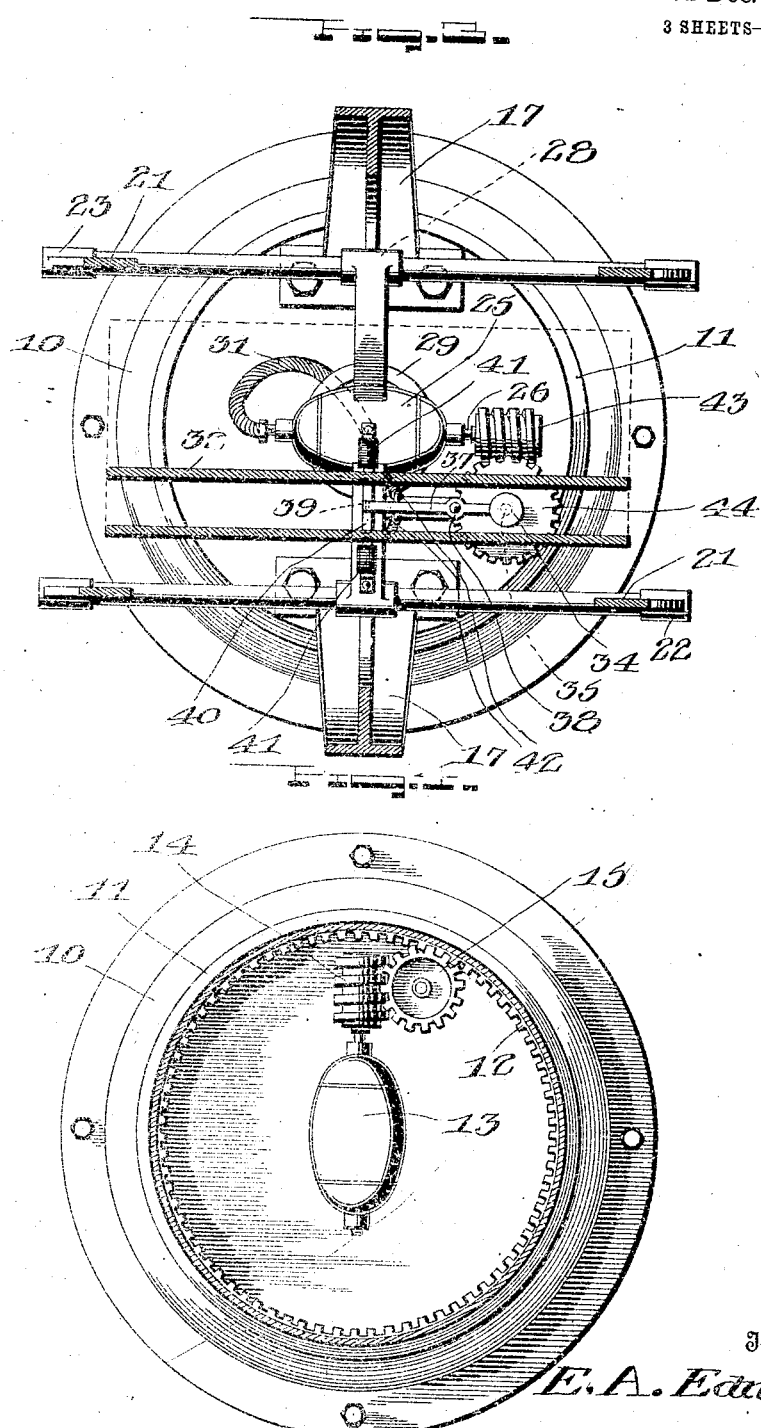
Witnesses
Inventor
E. A. Edmonds
By
Attorney

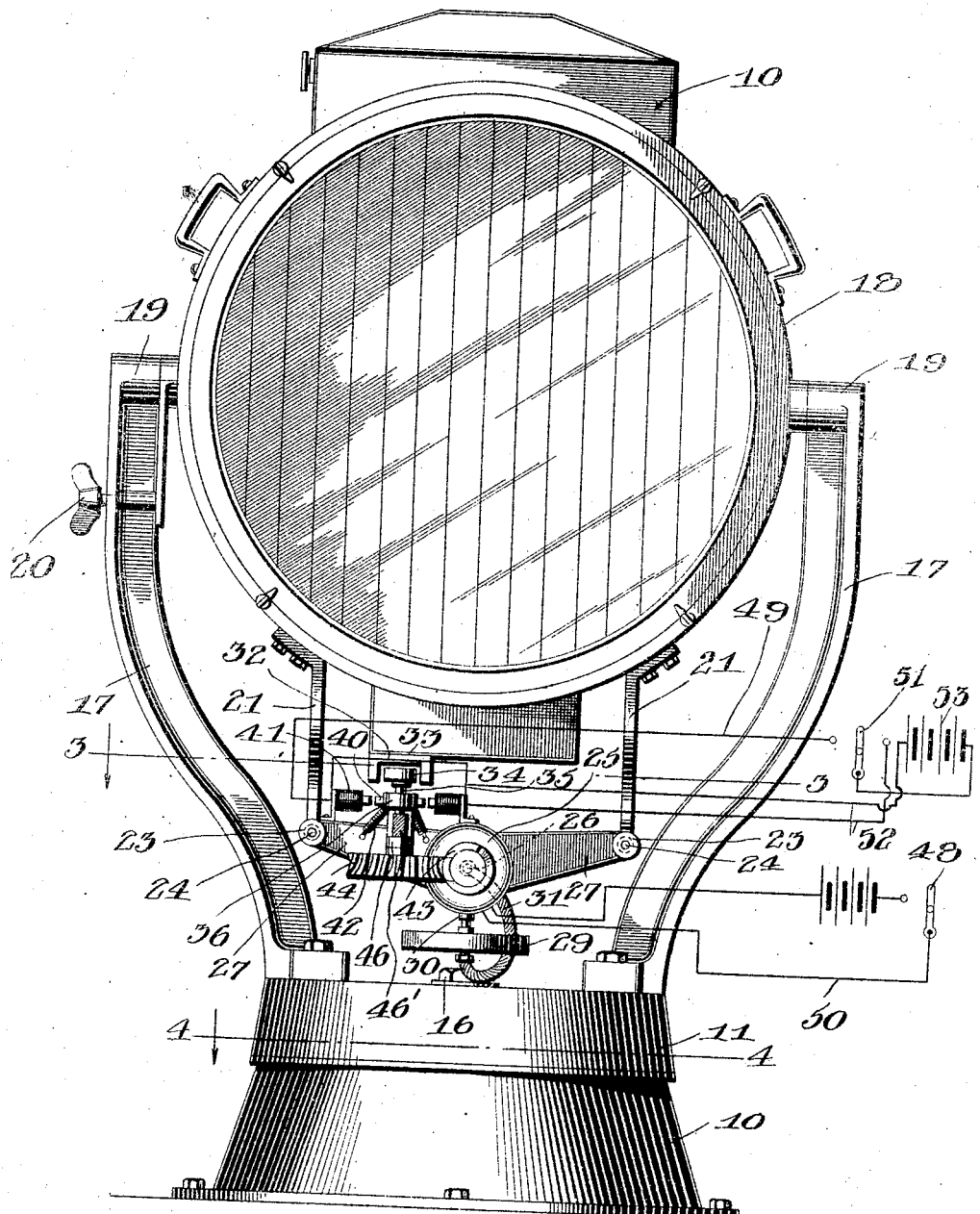

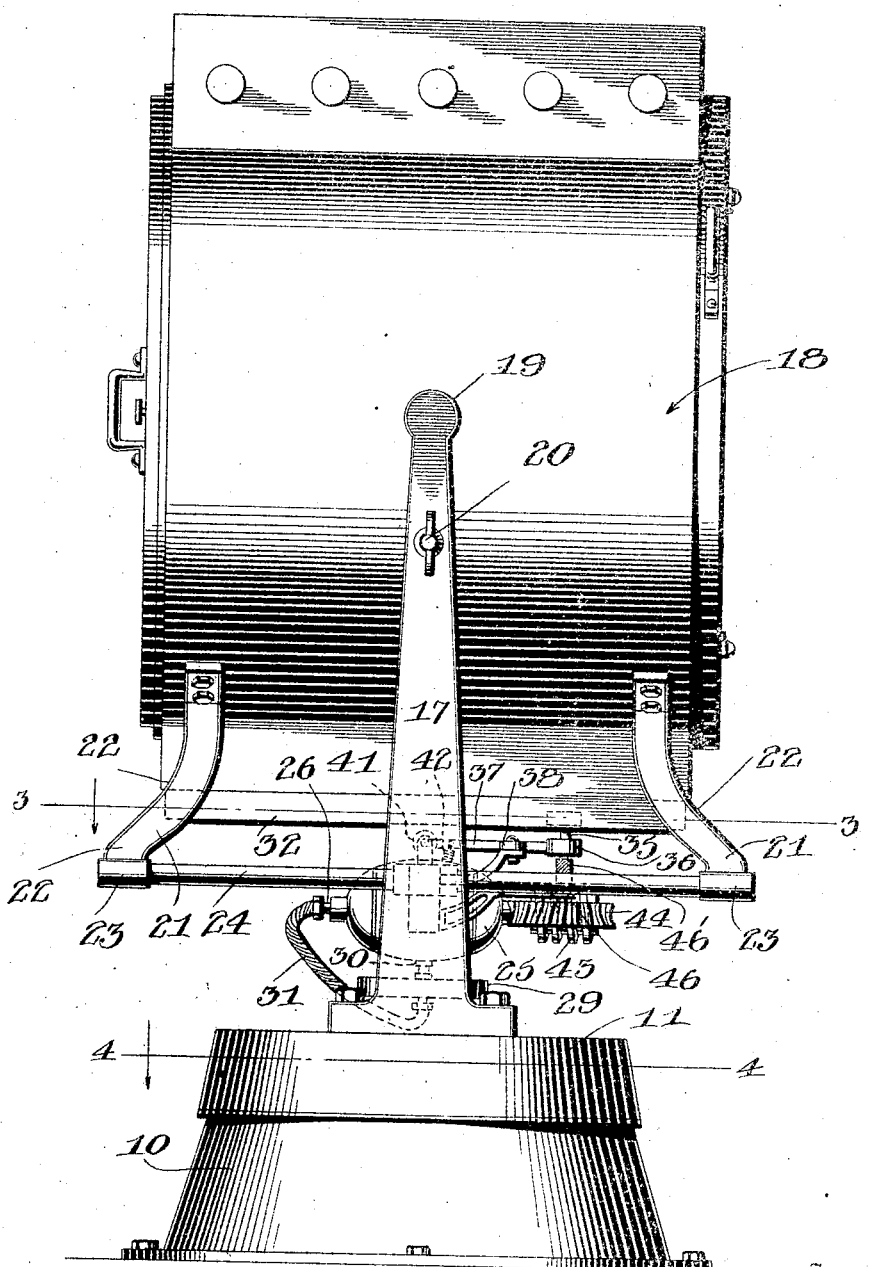

UNITED STATES PATENT OFFICE.

EUGENE ALLEN EDMONDS, OF MARE ISLAND, CALIFORNIA.

SEARCH-LIGHT PROJECTOR.

1,047,395.  Specification of Letters Patent.  Patented Dec. 17, 1912.

Application filed November 6, 1911. Serial No. 658,835.

*To all whom it may concern:*

Be it known that I, EUGENE A. EDMONDS, a citizen of the United States, residing at Mare Island, in the State of California, have invented certain new and useful Improvements in Search-Light Projectors; and I do hereby declare the following to be a full, clear, and exact description of the invention, such as will enable others skilled in the art to which it appertains to make and use the same.

This invention relates to search lights and has special reference to a novel form of projector for such devices.

It is a well understood fact that in using search lights at sea much difficulty is experienced on account of the rolling or pitching of the vessel in keeping the search light directed on the object desired to be illuminated by reason of the oscillation of the beam or ray.

The principal object of the present invention is to provide a search light in which the vertical angle of the beam with the horizontal may be varied at will while at the same time the beam may be held constantly on an object when the same is once picked up.

In effecting the above desiderata, this invention resides in the novel features of construction, formations, combinations and arrangements of parts to be hereinafter more fully described, claimed and illustrated in the accompanying drawings, in which:

Figure 1 is a front elevation of a search light constructed in accordance with this invention. Fig. 2 is a side elevation thereof. Fig. 3 is a horizontal sectional view taken on the line 3—3 of Fig. 1 looking in a direction toward the arrow head. Fig. 4 is a similar view taken on the line 4—4 of Fig. 1 looking in an opposite direction.

Referring to the accompanying drawings throughout the several views, the numeral 10 designates the base of the projector upon which is positioned a turn table 11, the latter being provided with an internal gear 12. Within the base 10 is a motor 13, the shaft of which is provided with a worm 14 which meshes with a gear 15, the latter in turn meshing with the gear 12 so that by actuation of the motor the turn table may be rotated about a vertical axis. The turn table is held upon the base by the usual means as indicated by the bolt and the nut 16.

Secured at diametrically opposed points on the turn table 11 and projecting upwardly therefrom are arms 17, the two arms constituting a yoke. Between these arms 17 is swung the usual lantern 18 which may be of any preferred form and construction and which is provided with the usual trunnions (not shown) fitted with the retaining caps 19. By this means the lantern may be swung in a vertical plane, while in order to prevent such swinging movement, except when desired, the usual lock 20 is provided. Depending from the lower end of the lantern are spaced pairs of brackets 21 the lower ends of which are curved outwardly as at 22 and provided with alining sleeves 23 in which are secured a pair of spaced parallel supporting rods 24.

The numeral 25 designates generally a motor casing from the opposite ends of which extend the motor shaft 26, while projecting from the sides thereof are a pair of arms 27 formed with eyes 28 which embrace the shafts 24 and serve to support the motor slidingly thereon which acts as a counterbalance for the lantern 18.

A rotatable wheel 29 is supported in suitable bearings 30 below the casing 25 of the motor and is connected by means of a flexible shaft 31 to one end of the motor shaft 26 to provide a means whereby the said wheel 29 will act as a gyroscope and serve to retain the lantern upon a vertical axis.

A longitudinally extending channel bar 32 is attached as indicated by the numeral 33 to the bottom of the lantern and has located therein a roller 34 formed preferably from leather or other similar material. This roller 34 is mounted upon the upper terminal of a shaft 35 which is journaled in a bearing 36 formed upon one end of a pivoted rod 37 which is mounted in a pin 38. The opposite end of the pivoted rod 37 is formed with an eye 39 through which extends a lever 40 which is actuated by a pair of solenoids 41 which serve to operate the rod 37 and force the roller 34 into engagement with the opposite flanges of the channel bar 32 for a purpose to be later explained. In order to retain the roller 34 in the center of the channel and in spaced relation to the side flanges of the bar 32, a pair of springs 42 are connected to the rod 37 and yieldingly retain the same in such position when the current has been switched off from the solenoids 41.

A worm 43 is keyed to one end of the shaft 26 and meshes with a worm wheel 44 keyed to a shaft 45 journaled in suitable bearings 46 attached to the motor casing 25. This shaft 45 is connected to the shaft 35 by a flexible shaft 46' in such manner that when the roller 34 is moved to engage the opposite side flanges of the bar 32 the motor casing will be moved longitudinally of the rods 25 without necessitating the reversing of the said motor.

The motor is operated by means of a switch 48 which is connected to the same by wiring 49 and 50, while the solenoids are alternately energized at will by the switch 51 controlling the passage of the current through the conductors 52 from the batteries 53.

In operation the motor 13 is used to bring the beam in vertical alinement with the object while the rotation of the other motor causes the casing 25 to be moved longitudinally of the rods 28 which obviously moves the beam into horizontal alinement with the said object, and through the rotation of the wheel which acts as a gyroscope, the beam will remain centered. It is to be understood that prior to doing this the lock 20 must necessarily be released. Now if the lock 20 be left released it will be obvious that the rolling of the vessel will not affect the beam to an appreciable extent by reason of the fact that the center of gravity of the combined lantern and counterweight together with the rotating wheel will at all times remain directly beneath the axis of rotation passing through the trunnions so that when the object is once picked up in this manner the beam will be constantly directed thereon.

From the foregoing disclosures taken in connection with the accompanying drawings it will be readily seen that a simple and efficient device of the character described has been provided for which will answer all of the purposes specified.

It is obvious that many minor changes may be made in the form and construction of this invention without departing from the material principles thereof. It is not therefore desired to confine the invention to the exact form herein shown and described, but it is wished to include all such as properly come within the scope of the appended claims.

It will be observed that the operating parts may be protected by a hood as shown in the dotted lines of the drawings.

Having thus fully described this invention what I claim as new and desire to protect by Letters Patent, is:

1. The combination in a search light projector, of a yoke, a lantern mounted in said yoke, rods supported by the lantern, a guide carried by the lantern, a motor casing slidable upon the rods, a roller located within said guide, means for rotating said roller and means for throwing the same into engagement with the opposite sides of the guide.

2. The combination in a search light projector, of a yoke, a lantern mounted in said yoke, rods supported by the lantern, a motor casing slidable upon the rods, a guide attached to the lantern, a roller located within said guides, a motor shaft, means operatively connecting the roller with the motor shaft, and means for moving said roller into engagement with the opposite sides of the guide.

3. The combination in a search light projector of a yoke, a lantern mounted in said yoke, rods supported by the lantern, a motor casing slidable upon said rods, a guide attached to the lantern, a roller located within said guide, a motor shaft, means operatively connecting the motor shaft with the roller, means for moving said roller into engagement with the opposite sides of the guide, a wheel rotatably mounted upon the motor casing, and means operatively connecting said wheel with the motor shaft.

In testimony whereof, I affix my signature, in presence of two witnesses.

EUGENE ALLEN EDMONDS.

Witnesses:
   C. A. KOHLS,
   C. U. TELLER.